(12) United States Patent
Morales

(10) Patent No.: US 11,503,166 B2
(45) Date of Patent: Nov. 15, 2022

(54) PRINT PROCESS CONTROL SYSTEM AND METHODS

(71) Applicant: Kyocera Document Solutions, Inc., Osaka (JP)

(72) Inventor: Javier A. Morales, Rochester, NY (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/199,737

(22) Filed: Mar. 12, 2021

(65) Prior Publication Data

US 2022/0294910 A1   Sep. 15, 2022

(51) Int. Cl.
*H04N 1/00*   (2006.01)
*G06F 3/12*   (2006.01)

(52) U.S. Cl.
CPC ....... *H04N 1/00031* (2013.01); *G06F 3/1237* (2013.01); *G06F 3/1285* (2013.01); *H04N 1/00023* (2013.01)

(58) Field of Classification Search
CPC combination set(s) only.
See application file for complete search history.

(56) References Cited

U.S. PATENT DOCUMENTS

| | | | |
|---|---|---|---|
| 7,768,672 B2 | 8/2010 | Gil et al. | |
| 2002/0159081 A1* | 10/2002 | Zeng | H04N 1/603 358/1.9 |
| 2005/0213144 A1 | 9/2005 | Uejo | |
| 2012/0243008 A1* | 9/2012 | Chatow | G06F 3/1254 358/1.9 |
| 2014/0009769 A1* | 1/2014 | Robinson | H04N 1/54 358/1.9 |
| 2014/0160501 A1* | 6/2014 | Beretta | G06K 15/027 358/1.9 |
| 2016/0277614 A1* | 9/2016 | Fukunaga | H04N 1/603 |
| 2019/0073164 A1* | 3/2019 | Yamasaki | G06F 3/1256 |
| 2019/0258437 A1* | 8/2019 | Chauvin | G06F 3/1288 |
| 2019/0377529 A1* | 12/2019 | Ohkawa | G06F 3/1263 |
| 2021/0294552 A1* | 9/2021 | Fujita | G06F 3/1258 |
| 2021/0329145 A1* | 10/2021 | Suehiro | G06F 3/1285 |

* cited by examiner

*Primary Examiner* — Helen Zong
(74) *Attorney, Agent, or Firm* — Millen, White, Zelano & Branigan, P.C.; William Nixon

(57) ABSTRACT

A print process control system includes a plurality of printing devices and an order management system to manage print jobs to the printing devices. Each printing device has an achievable quality level corresponding to its ability to meet color printing requirements. Job data for a print job is parsed to identify spot colors related to colors to be reproduced at the printing device. The printing device receives a test chart with color patches for the spot colors. Measurement data is captured from the color patches of the test chart. Using the measurement data, the order management system confirms whether the printing device can reproduce the spot colors according to a required level of tolerance or quality level.

10 Claims, 12 Drawing Sheets

| A. Printing Device | B. Achievable Quality | C. Assigned Print Jobs |
|---|---|---|
| 104 | 104Q - Standard (114B) | 110A, 110B, 110C → 110A |
| 106 | 106Q - Premium (114A) | 110A, 110B, 110C, 402 → 110B / 402 |
| 108 | 108Q - Budget (114C) | 110A or 110C → 110C |

| D. Printing Jobs | E. Quality Level | F. Cost Value |
|---|---|---|
| 110A | 112A - Budget (114C) | 450 |
| 110B | 112B - Standard (114B) | 452 |
| 110C | 112C - Cheap (114D) | 454 |
| 402 | 112D - Premium (114A) | 456 |

PRINT PROCESS CONTROL SYSTEM AND METHODS

FIELD OF THE INVENTION

The present invention relates to a print process control system that defines a quality level for a print job and uses the defined quality level to perform printing operations. The defined quality level also may be used to determine a cost associated with the print job.

DESCRIPTION OF THE RELATED ART

Process control for print shops usually revolves around either matching an industry-standard print condition or matching a repeatable press condition. In this instance, a press is characterized so that the characterization becomes the target for the print shop. In either case, the targets represent the gamut that the press is expected to reproduce reliably. While it is understood that achieving the target gamut means that the press will reproduce print jobs as expected, this standard may be both too strict and too loose in some cases. The act of keeping a press running within tight tolerances requires additional maintenance. The maintenance takes time away from production and, ultimately, from press profitability. In addition, this additional maintenance may not be required to reproduce print jobs at an acceptable level of quality depending on the nature of the print jobs to be printed. While there are inspection systems that can be used to evaluate whether a specific print job achieves the required level of quality, these systems require significant time to setup and must be configured for individual job. These conventional systems do not allow for work with any job in a print job.

SUMMARY OF THE INVENTION

A print process control method is disclosed. The method includes receiving a print job of a color document. The method also includes parsing job data for the print job related to the color document to identify at least one spot color. The method also includes determining a required level of tolerance for the at least one spot color of the print job. The method also includes routing the print job to a first printing device to process the print job by reproducing the at least one spot color. The method also includes confirming the first printing device can reproduce the at least one spot color for the print job within the required level of tolerance. The method also includes printing the color document of the print job at the first printing device.

A method for managing color printing on a printing device is disclosed. The method includes generating a test chart having at least one color patch. The method also includes printing the test chart at a printing device. The method also includes capturing measurement data pertaining to the at least one color patch. The method also includes determining at least one spot color that can be reproduced at the printing device based on the measurement data. The method also includes receiving a print job for a color document. The print job includes job data. The method also includes identifying the at least one spot color from the job data. The method also includes routing the print job to the printing device according to the at least one spot color.

A print process control system is disclosed. The system includes an order management system configured to receive a print job of a color document. The order management system also is configured to parse job data for the print job related to the color document to identify at least one spot color. The order management system also is configured to determine a required level of tolerance for the at least one spot color for the print job. The order management system also is configured to route the print job according to the required level of tolerance to reproduce the at least one spot color. The system also includes a printing device configured to capture measurement data to confirm that the printing device can reproduce the at least one spot color for the print job. The printing device also is configured to print the color document of the print job.

BRIEF DESCRIPTION OF THE DRAWINGS

Various other features and attendant advantages of the present invention will be more fully appreciated when considered in conjunction with the accompanying drawings.

FIG. 4 illustrates a table showing parameters for printing devices to route print jobs according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Target print job—a printed page, containing rows of test color strips.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments include a system that allows the print shop to specify and then track the acceptable level of print quality for both individual customers and individual print jobs for the customers. In order to enable the use of this functionality, the disclosed embodiments track customer and job information with an enhancement to include additional functionality about the customer and perhaps about specific print jobs. Specifically, the print shop may define certain levels of quality for print jobs. The disclosed system may manage print shop customers by specifying a quality level for each of the customers. When the customer orders a print job, the print job automatically is assigned to the customer's preferred quality level.

Figure 1A:
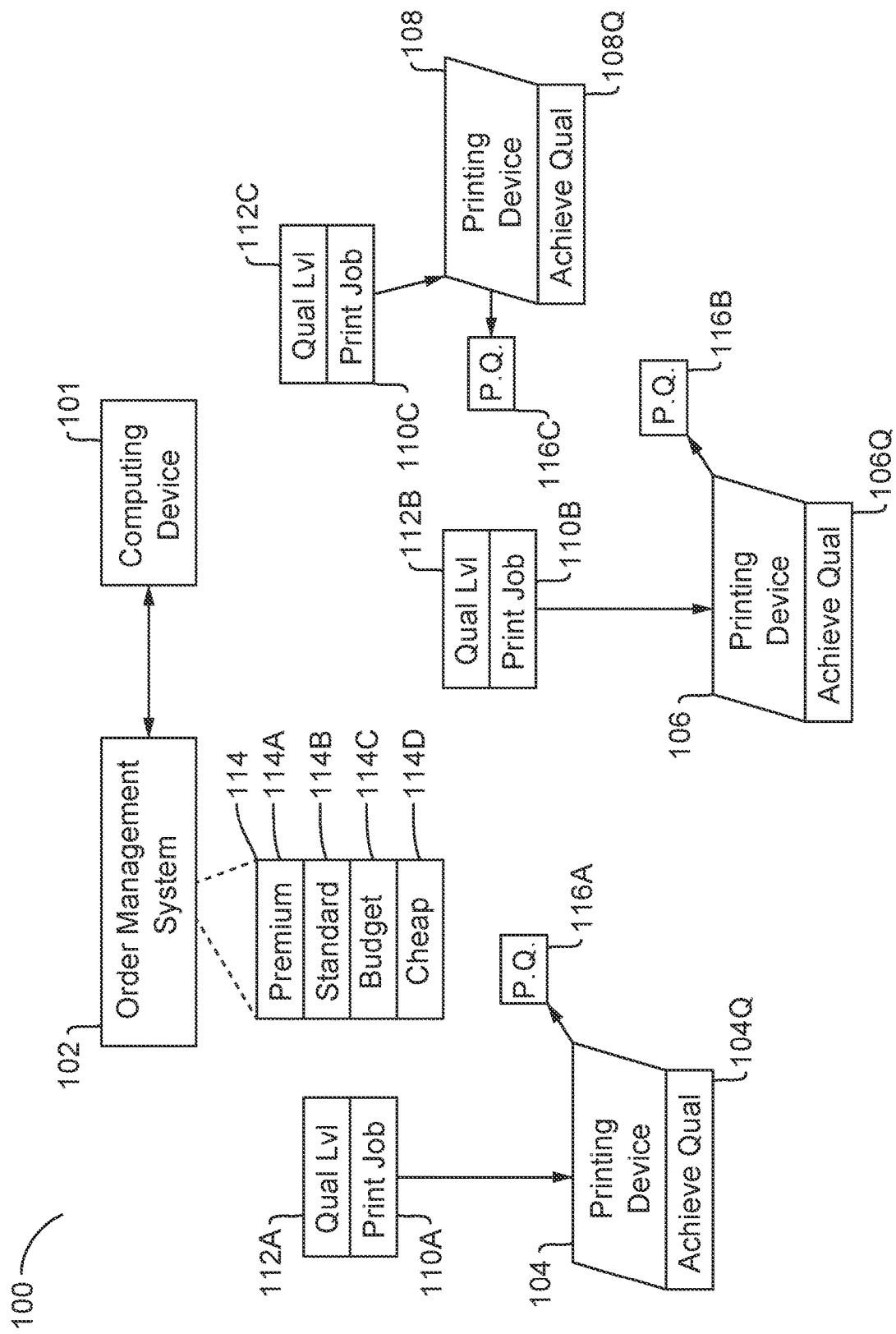
FIG. 1A illustrates a print process control system for managing printing operations on a plurality of printing devices according to the disclosed embodiments.

FIG. 1A depicts a print process control system 100 for managing printing operations on a plurality of printing devices according to the disclosed embodiments. Print process control system 100 may manage print jobs to a plurality of printing devices, shown as printing devices 104, 106, and 108. An example of the components of a printing device is disclosed by FIG. 2. Order management system 102 may queue and forward print jobs to the printing devices according to the disclosed embodiments. In some embodiments, order management system 102 may be a server connected via a network with the printing devices.

The printing devices may receive print jobs within print process control system 100. For example, print job 110A may be sent to printing device 104, print job 110B may be sent to printing device 106, and print job 110C may be sent to printing device 108. The print jobs may be different in content, paper media, size, and other factors. The print jobs also may differ in quality level, which may impact cost of the print jobs, the printing device used to print the print jobs, and how print jobs are tracked within system 100.

Print process control system 100 includes additional functionality about the customer and about specific jobs to track customer and job information. Specifically, system 100 using order management system 102 may define certain levels of quality for print jobs. Order management system 102 manages print shop customers, such as an MIS or Web2Print system, may be configured to specify a quality level for each of the customers. When the customer orders a print job, the print job is automatically assigned to the customer's preferred quality level.

The customer also may elect to specify the expected quality level for a specific job. The specified quality level may be entered into order management system 102. For example, order management system 102 may be a web-to-print commercial printing system. Partners and customers may submit print jobs on a website that are then printed within print process control system 100. When entering the print job, the customer may select a quality level for the print job. Pricing for the print job also may be provided, which reflects a premium or discount based on the required quality level.

Thus, print process control system 100 tracks not just customer information but also expected quality information to enhance customer and order management. Customers are provided with the ability to see differential pricing for different quality levels. A customer is allowed to decide on the quality level for which he/she wants to pay. Thus, the disclosed embodiments provide a web-to-print solution, which offer online storefronts for print shops, to offer tiered pricing based on schedule and based on the quality of the materials, such as premium paper, or the process, such as CMYK+OG printing versus CMYK printing.

Print process control system 100 may be configured to track any customer information that the print shop wants to track. This information, however, is often contextless, which means that it is just data and has no intrinsic meaning to the system itself. The disclosed embodiments, on the other hand, track the required print quality level as a metric that has intrinsic meaning within the system. As such, system 100 may aggregate information about the achievable quality levels for all printing devices in the print shop to schedule or route print jobs accordingly. This features automates or optimizes the print process within system 100.

Print process control system 100 also may use job costing information to determine pricing between print jobs. The feature of tracking quality levels would allow the disclosed embodiments to use only relevant printing devices when generating a price quote for a specific job. System 100 may look to those printing devices that can achieve the required quality level when considering where to print. The disclosed embodiments may automatically track quality. They also may offer differential pricing for different quality levels. The scheduling and routing features associated with differential pricing based on quality levels also applies to web-to-print systems.

Another feature of the disclosed embodiments is providing customers the option to specify a quality level for a print job while also providing them with differential pricing for the quality levels. Another feature of the disclosed embodiments is that the print shop may aggregate information about the quality requirements for their customers in order to provide the option to consider allocating different quality targets to different printing devices.

For example, print process control system 100 may consider installing 15 printing devices. As disclosed above, the system may offer customers the ability to choose the quality level for which they would like to pay. The customer may then track the distribution of work at different quality levels and assign quality targets to printing devices per that distribution. Using the above example, if only 10% of customers want to match colors at premium quality level 114A, 20% want to match at standard quality level 114B, and the remaining 70% are comfortable with budget quality level 114C or cheap quality level 114D, then system 100 may specify that 2 printing devices be kept at a tolerance for premium quality level 114A, 3 printing devices be kept at a tolerance for standard quality level 114B, and 10 printing devices be kept at a tolerance for budget quality level 114C.

In some embodiments, print process control system 100 may track color reproduction performance for all printing devices. The tracking of color reproduction performance means tracking the gamut that a given printing device can theoretically reproduce as well as tracking the current state of the printing device. For example, printing device 106 may be able to reproduce characterized reference print condition (CRPC) 6, or CRPC6 if system 100 follows a rigorous maintenance schedule. If system 100, however, wants to perform maintenance on a less regular basis, then printing device 106 may only be able to achieve CRPC5 or CRPC4.

Another feature of the disclosed embodiments includes tracking both the potential and actual color reproduction performance for a printing device in order to allow system 100 to allocate print jobs based on the printing device's current and theoretical ability to reproduce the print jobs. For example, print process control system 100 may track the best possible color for a printing device, such as CRPC7 at the premium quality level, which should be done right after maintenance or calibration of the printing device. Print process control system 100 also will periodically check the performance of the printing device, which without maintenance declines over time as the printing device drifts away from calibration. Thus, print process control system 100 may schedule maintenance based on the quality level of print jobs within the system.

In some embodiments, print process control system 100 may track performance but not require maintenance of the printing device. For example, printing device 108 has the capacity to achieve CRPC7 at premium quality level 114A but at this instance, it can only achieve CRPC6 at standard quality level 114B. Thus, print jobs requiring premium quality level 114A will not be sent to printing device 108, or may go into a queue until maintenance is complete on the printing device. Thus, the disclosed embodiments may assign print jobs to printing devices based on the current color reproduction accuracy versus the potential color reproduction accuracy.

This feature may be extended to scheduling where print process control system 100 may schedule print jobs based on their quality requirements. Print process control system 100 also may schedule printing device maintenance to bring the quality level up ahead of print jobs that require the higher level. This feature would allow system 100 to minimize downtime for maintenance while ensuring that every print job is printed at the required quality level. The job scheduling itself would consider the time required for maintenance when determining the possible time frame in which a print job could be printed. Print process control system 100 also may compile the high-quality print jobs into a few printing devices as possible in order to minimize the printing devices that would require maintenance.

Order management system 102 may route print jobs to printing devices in accordance with the above disclosed embodiments. It, however, also may route jobs to one printing device for immediate printing if the printing device can print the print job without maintenance. Order management system 102 also may route the print jobs to another queue so that print job can be held until maintenance is performed so the required gamut can be reproduced. Thus, the disclosed embodiments may use the required quality levels to influence job routing by considering a printing device's current ability to reproduce colors at a specific level of quality. This feature is different than considering the printing device's ideal quality. Instead, it considers the current quality.

Alternatively, a printing device's DFE may receive all print jobs but then prevent printing of print jobs that require a level of quality that the printing device cannot currently achieve. After maintenance is performed on the printing device, the printing device may determine the gamut that the printing device can reproduce and automatically release jobs that were previously held because the printing device could not reproduce the required gamut. Thus, for example, printing device 104 is able to evaluate its own print quality 116A in a meaningful way and to influence job processing.

Thus, the disclosed embodiments determine whether print jobs queued to print should print based on the printing device's current quality level. Typically, when production printing devices do "resource-based scheduling," they evaluate items like media, finisher status, output bin, and tray status in order to determine whether a print job should print or now. The disclosed embodiments add print quality.

Referring back to FIG. 1A, computing device 101 may be connected to order management system 102. These components may be connected over a network, such as a web-to-print environment. One or more computing devices may be connected to order management system 102. Customers may send print jobs for printing within system 100 through order management system 102.

As disclosed above, one may specify a quality level for one or more print jobs. For example, quality levels 114 include premium quality level 114A, standard quality level 114B, budget quality level 114C, and cheap quality level 114D. The quality levels may correspond to color tolerances within the gamut of colors available on a printing device. The tolerances may correspond to the tightness of color quality, or the distance between locations of specific colors in different places. In some embodiments, the tolerance with relate to the deviation between a potential reproduction of a color and the actual reproduction of the color. "Potential" reproduction of a color also includes a desired reproduction of the color specified by the print job. This tolerance may be represented by ΔE or dE.

Thus, premium quality level 114A may represent a printing gamut having spot color tolerance of 2dE. Standard quality level 114B may represent a printing gamut having spot color tolerance of 4dE. Budget quality level 114C may represent a printing gamut having spot color tolerance of 6dE. Cheap quality level 114D may represent a printing gamut having spot color tolerance of 8dE. In some embodiments, the deviation allowed for a cheap quality level print job is greater than that of the other quality levels. In contrast, the premium quality level has the tightest or smallest allowable deviation between the potential reproduction of a color and the actual reproduction.

Thus, quality levels 114 provide a measurable metric that is used to schedule, price, route, and manage print jobs as well as the maintenance of printing devices within system 100. For example, order management system 102 may send print job 110A having a print job quality level 112A of budget quality level 114C to printing device 104. Printing device 104 may have an achievable quality level 104Q that allows print job 110A to be printed. For example, achievable quality level 104Q may be standard quality level 114B. Thus, print job 110A with print job quality level 112A of budget quality level 114C is acceptable to be printed.

Printing device 106 may receive print job 110B having a quality level 112B assigned or specified for the print job by order management system 102. Printing device 106 includes an achievable quality level 106Q of premium. Thus, printing device 106 should be able to take all print jobs generated within system 100. Quality level 112B of print job 110B is standard such that it may be accepted and processed at printing device 106. Printing device 106 may be the only printing device within its group that can achieve the premium quality level. Thus, all print jobs specifying premium quality level 114A may be routed to printing device 106.

Printing device 108 may receive print job 110C having a quality level 112C assigned or specified for the print job by order management system 102. Printing device 108 may include the lowest achievable quality level within system 100. Achievable quality level 108Q may correspond to budget quality level 114C. Print jobs 110A and 110B may not be processed at printing device 108 absent some action being taken to improve the achievable quality level for printing operations. Print job 110C may have a quality level 112C of cheap quality level 114D and, therefore, may be received at printing device 108.

System 100 also includes the feature of printing devices 104, 106, and 108 being able to evaluate their own print quality in a meaningful way. Each printing device may be able to provide the respective print quality to order management system 102 in order to route and manage print jobs. Printing device 104 may have a print quality 116A, which may be expressed as gamut+dE. Printing device 106 may have print quality 116B while printing device 108 has print quality 116C. The print qualities may differ between devices. Print quality may reflect the achievable quality level in the specified printing device.

Figure 1B:
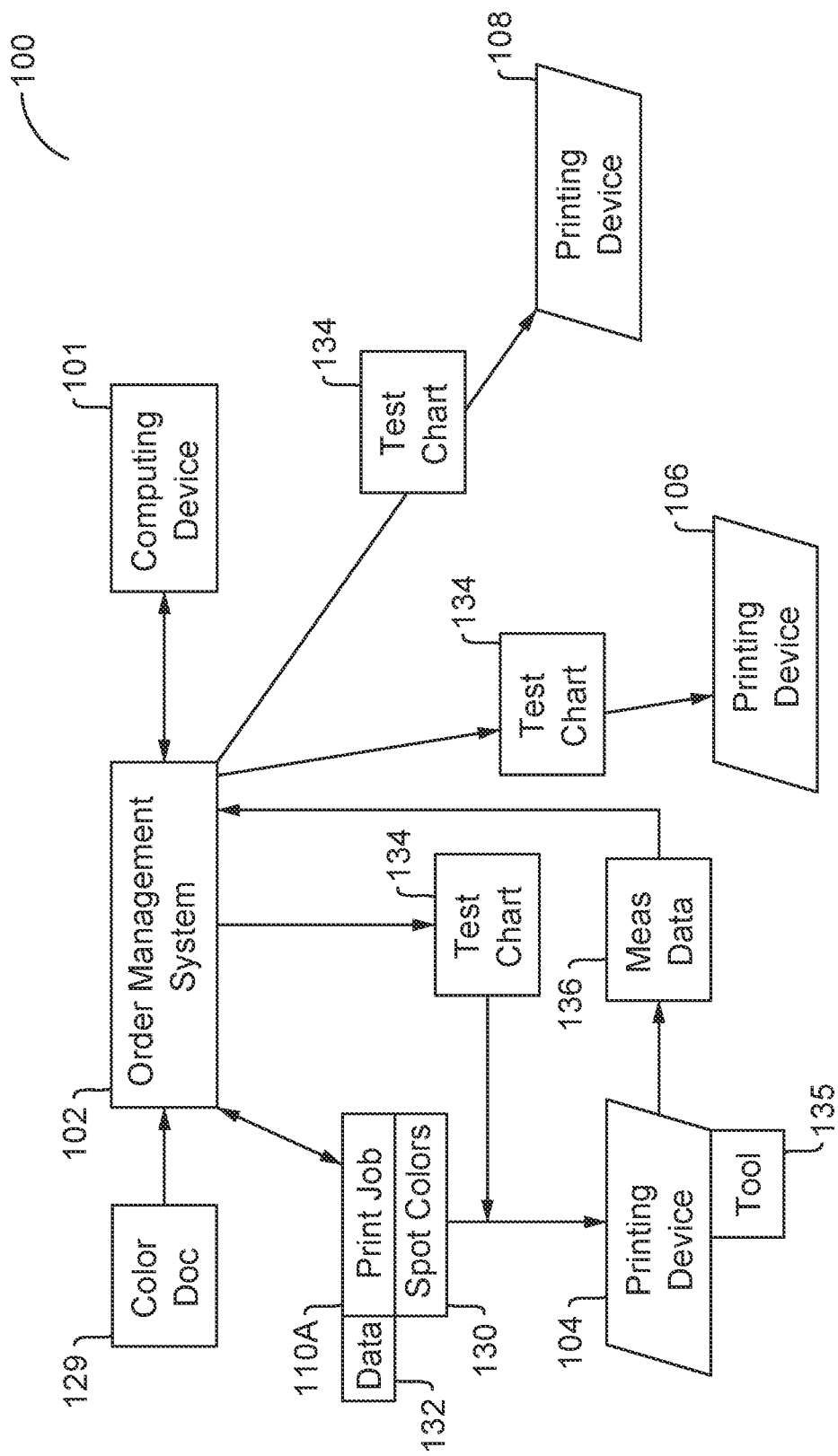
FIG. 1B further illustrates the print process control system according to the disclosed embodiments.

FIG. 1B further depicts print process control system 100 according to the disclosed embodiments. Instead of corresponding the quality levels with color gamut reproduction, some embodiments would consider a printing device's ability to reproduce spot colors. Printing devices have an innate ability to reproduce a subset of spot colors. The highest quality printing devices may reproduce 95+ of spot colors at a tolerance of 2dE, or comparable to premium quality level 114A disclosed above.

Spot colors and related printing processes may differ from process or CMYK printing. Spot colors differ in that there is no mixing of colors during printing operations. Spot colors may come as pre-mixed recipes, which may be device dependent. For example, a specific shade of green may be achieved through process printing by mixing certain combinations of inks, such as cyan and yellow. Differences in printing devices, inks, and calibration settings, however, could lead to different results within system 100. The same shade of green may be achieved with spot colors using a precisely pre-mixed recipe. Thus, the use of spot colors may lead to uniform and consistent color results for printing devices 104, 106, and 108 for a variety of print jobs.

In some embodiments, color document 129 is received at order management system 102 to print within system 100. Color document 129 may have color text or images that need to reproduce on a printing device. A print job, such as print job 110A, is generated as a result. Order management system 102 should determine which printing device can perform the required color printing to accurately reproduce color documents 129.

Order management system 102 may analyze the data associated with color document 129 to determine parameters or settings needed to effect the color printing. Order management system 102 may parse the job data, such as that in the PDF files and look for spot colors. System 102 determines the specific spot colors required by the print job. System 102 then may act as disclosed above except that it may just consider the ability to reproduce the specific spot colors in the print job at the required level of tolerance, or quality level. Thus, system 100 along with order management system 102 could be configured to just consider spot colors or to consider both gamut and spot colors.

Referring to FIG. 1A, once order management system 102 determines the spot colors and the required level of tolerance, it may assign a quality level 114 corresponding to the level of tolerance. Order management system 102 then may process the print jobs as disclosed above along with the additional features disclosed below. As shown in FIG. 1B, job data 132 of print job 110A is parsed to determine spot colors 130. Based on the required tolerance for spot colors 130, assigned quality level 112A is determined. Before routing print job 110A to printing device 104, order management system 102 may determine whether achievable quality level 104Q can achieve the required tolerance.

In some embodiments, spot color evaluation may use the gamut as a way to determine whether spot colors 130 specified for print job 110A could be reproduced within the required tolerance. Another embodiment may take a more direct approach to spot color evaluation. Order management system 102 may select a printing device for the print job based on the gamut. Order management system 102 may go further to generate a test chart 134 with color patches that include spot colors 130 that print job 110A requires. Order management system 102 may instruct printing device 104 to print test chart 134 and retrieve measurement data 136 for the spot colors using an inline spectrophotometer, shown as color measurement tool 135. Color measurement tool 135 also may be a handheld device used by an operator to capture measurement data 136 from test chart 134. Thus, order management system 102 may generate job-specific patches to measure spot color capability with the spectrophotometer.

Order management system 102 also may generate and print test chart 134 to use it to evaluate printing device 104 before assigning print job 110A to the printing device. Alternatively, if printing device 104 is theoretically able to reproduce the spot color, then order management system 102 would use the chart to determine whether maintenance should be performed before sending print job 110A. In some embodiments, order management system 102 may consider a plurality of test charts 134 in making these determinations. This process may not be performed for all print jobs. It may be applied to those print jobs that have high quality requirements, such as premium quality level 114A, or for print jobs for important or specific customers. For example, if order management system 102 determines that print job 110A must reproduce spot colors 130 at a tight tolerance, then it will generate test chart 134 for the spot colors. Using the results provided by measurement data 136, order management system 102 may route print job 110A to printing devices or may hold the print job until maintenance is done to meet the required tolerances.

Test charts 134 may be handled in different ways. In one embodiment, order management system 102 may generate and print a test chart 134 in the middle of printing other print jobs, either between print jobs or in the middle of a print job. Test chart 134 may be diverted to a top tray, which is not usually used for production printing operations, but only for proofing and maintenance print jobs. Alternatively, order management system 102 may put the color patches for spot colors 130 on the margins of previous print jobs if the print jobs have unused space on the sheet.

Order management system 102 may even alternate between the two embodiments disclosed above in that it may print on the bleed area of a print job if there is room. It also may wait for a print job that has bleed if the current job does not have bleed. If there are no scheduled print jobs with bleed between when the print job is assigned to the printing device and when the print job needs to print, then order management system 102 may switch to printing on a dedicated sheet so the two mechanism may be combined with some additional logic. In addition, in production printing, there may be a banner or job sheet that is printed with a print job. Order management system 102 may add patches to this sheet. Using measurement data 136 obtained from measuring the color patches, order management system 102 would determine whether to print or not print print job 110A.

Order management system 102 may use the received data from the printing devices to determine how accurately a printing device could reproduce the required spot colors, such as spot colors 130. If spot colors 130 cannot be reproduced, then order management system 102 may prompt for the operator to perform maintenance on the printing device. Alternatively, order management system 102 may select another printing device and test it for spot color accuracy.

The disclosed embodiments also may evaluate spot color reproduction performance for multiple jobs at a time. For example, order management system 102 may consider a test chart 134 with 14 color patches therein related to:

Print Job 1 with 1 spot color;
Print Job 2 with 3 spot colors;
Print Job 3 with 2 spot colors;
Print Job 4 with 5 spot colors;
Print Job 5 with 2 spot colors; and
Print Job 6 with 1 spot color.

Instead of evaluating each job separately, order management system 102 may build one test chart 134 for all 6 jobs that is printed and measured at a printing device in a single operation. This feature may optimize the spot color testing process. Order management system 102 also may generate all of the test targets disclosed above and send to one or more printing devices for verification before any print jobs are routed within system 100. These embodiments may apply to only gamut information, only spot color information, or using both gamut and spot color information.

Gamut evaluation is performed using an offline check because this can require scanning a significant number of patches. Order management system 102, however, may be enhanced to evaluate gamut in real time using a small set of patches for color that are known to only be possible if the printing device can reproduce a specific gamut. For example, colors of interest may be outside of the CRPC4 gamut but inside of the CRPC5 gamut. This real-time gamut evaluation may be performed for a specific job.

Further, order management system 102 may combine the gamut and spot color inline checks so that test chart 134 includes the spot colors from the print job and a targeted set of colors per the gamut check, as disclosed above. Test charts 134 also may be used for gamut evaluation. Whether spot colors 130 can be achieved is based on the gamut. Order management system 102 implements a hybrid of direct spot color charts and gamut boundary checks.

In some embodiments, order management system 102 may determine the specific gamut requirement for a print job by images within the print job. For example, order management system 102 may determine that, although the customer requires print jobs to reach CRPC6, the specific file that is submitted may be accurately reproduced using the CRPC5 gamut. Order management system 102 would then use the lower requirement for determining how the print job should be printed. The specific print job would be converted to the desired color space. The gamut of the color converted document would be characterized in order to determine how it compares to the printing device's gamut. This feature may differ from conventional processes as gamut requirements for specific print jobs are not generally performed at print shops. To be feasible, the gamut check would need to be done using an inline instrument, or color measurement tool 135, that would measure and evaluate without operator intervention.

As shown in FIG. 1B, test charts 134 may be sent to all the printing devices within system 100. Measurement data 136 generated by measuring the color patches for spot colors 130 in test charts 134 from printing devices 106 and 108 also is sent to order management system 102 to make determinations where to route print jobs and to schedule maintenance, if needed. Thus, the disclosed embodiments may take existing print jobs to generate test charts that test the printing devices can achieve the required quality levels to process the print jobs.

Figure 1C:
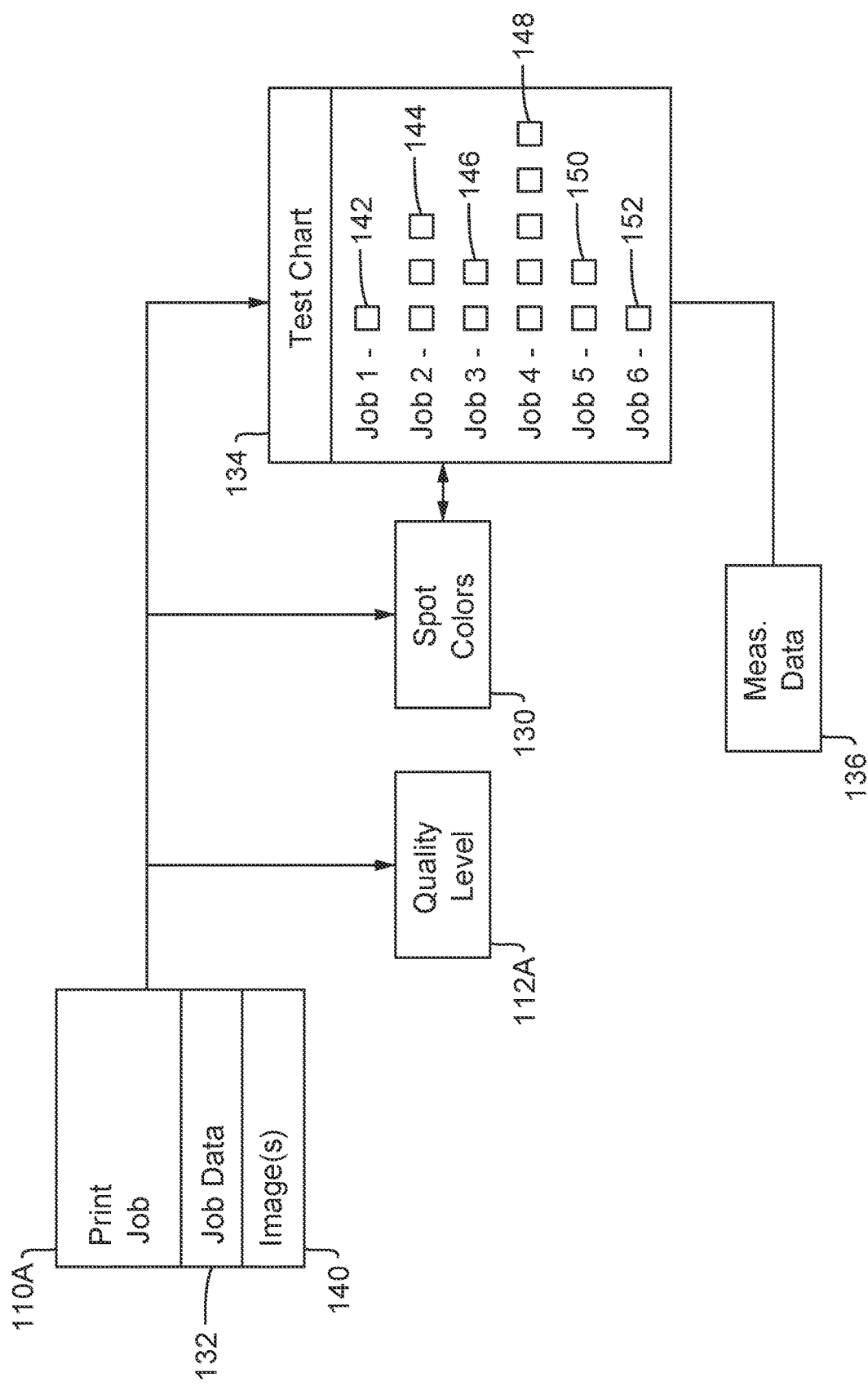
FIG. 1C illustrates a block diagram of the process of generating spot colors and a test chart according to the disclosed embodiments.

FIG. 1C depicts a block diagram of the process of generating spot colors 130 and test chart 134 according to the disclosed embodiments. FIG. 1C may show the features related to embodiments disclosed by FIG. 1B. Order management system 102 may receive a request to print a document, shown as print job 110A, within system 100. The document includes job data 132 and possibly one or more images 140. Order management system 102 may parse job data 132 and image(s) 140 to determine the specific spot colors from print job 110A. It also may do so for multiple print jobs received in system 100, such as print jobs 110B and 110C. The data and images may indicate specific colors to be used in the print jobs. Further, the data and images may be analyzed to determine if spot colors are indicated.

Using this information, order management system 102 generates spot colors 130 associated with print job 110A. The number of identified spot colors may vary, as disclosed above. Some print jobs may only have one spot color while others have several or more. Order management system 102 also may determine an assigned quality level 112A for print job 110A using the spot color information. Assigned quality level 112A may be used by order management system 102 as disclosed above and below to route and manage print job 110A within system 100. For example, if spot colors 130 require a tolerance of 4dE then print jobs 110A may be assigned a standard quality level 114B for printing quality.

For reference purposes, premium quality level 114A may relate to a spot color tolerance of 2dE. Standard quality level 114B may relate to a spot color tolerance of 4dE. Budget quality level 114C may relate to a spot color tolerance of 6dE. Cheap quality level 114D may relate to a spot color tolerance of 8dE. Different quality levels may be defined for other spot color tolerances. A printing device should have an achievable quality level corresponding to the assigned quality level in order to process the print job.

Order management system 102 also may use spot colors 130 to generate test chart 134, as disclosed above. Test chart 134 includes color patches that are measured to ensure that the target printing device can achieve the required spot color tolerance. Measurement data 136 captured by measuring the color patches is then used to make routing and managing decisions for the print job or print jobs. Also disclosed above, test chart 134 may include spot color patches for multiple print job evaluations to save time and resources when capturing measurement data 136 by, for example, color measurement tool 135.

In some embodiments, order management system 102 receives 6 print jobs. It parses job data 132 and any image(s) 140 to identify spot colors 130 for each print job. As disclosed above, the number of spot colors 130 for each job varies. Thus, the number of color patches generated may vary as well. Referring to FIG. 1C, print job 1 generates 1 color patch 142 for test chart 134. Print job 2 generates 3 color patches 144. Print job 3 generates 2 color patches 146.

Print job 4 generates 5 color patches. Print job 5 generates 2 color patches. Print job 6 generates 1 color patches. Thus, test chart 134 may include 14 color patches.

Test chart 134 may be sent to printing device 104 and measured to determine if printing device 104 can achieve the required tolerances for print jobs 1-6. In some embodiments, printing device 104 can achieve the required tolerances for some of the print jobs but not others. Order management system 102 tracks measurement data 136 from test chart 134 to indicate which print jobs are acceptable. Order management system 102 then may make routing decisions. For example, print job 3 may require a premium quality level 114A. Measurement data 136 for color patches 146 may indicate the spot color tolerance for premium quality level 114A is not achievable at printing device 104. Order management system 102 then may route the print job elsewhere.

Test chart 134 with color patches 142-152 may be sent to all printing devices within system 100 to capture measurement data 136 from each device. Order management system 102 then may route and manage print jobs according to the received data indicating the achievable quality levels of the printing device. Order management system 102 also may schedule maintenance or other procedures to improve tolerances to accommodate the print jobs.

Figure 2:
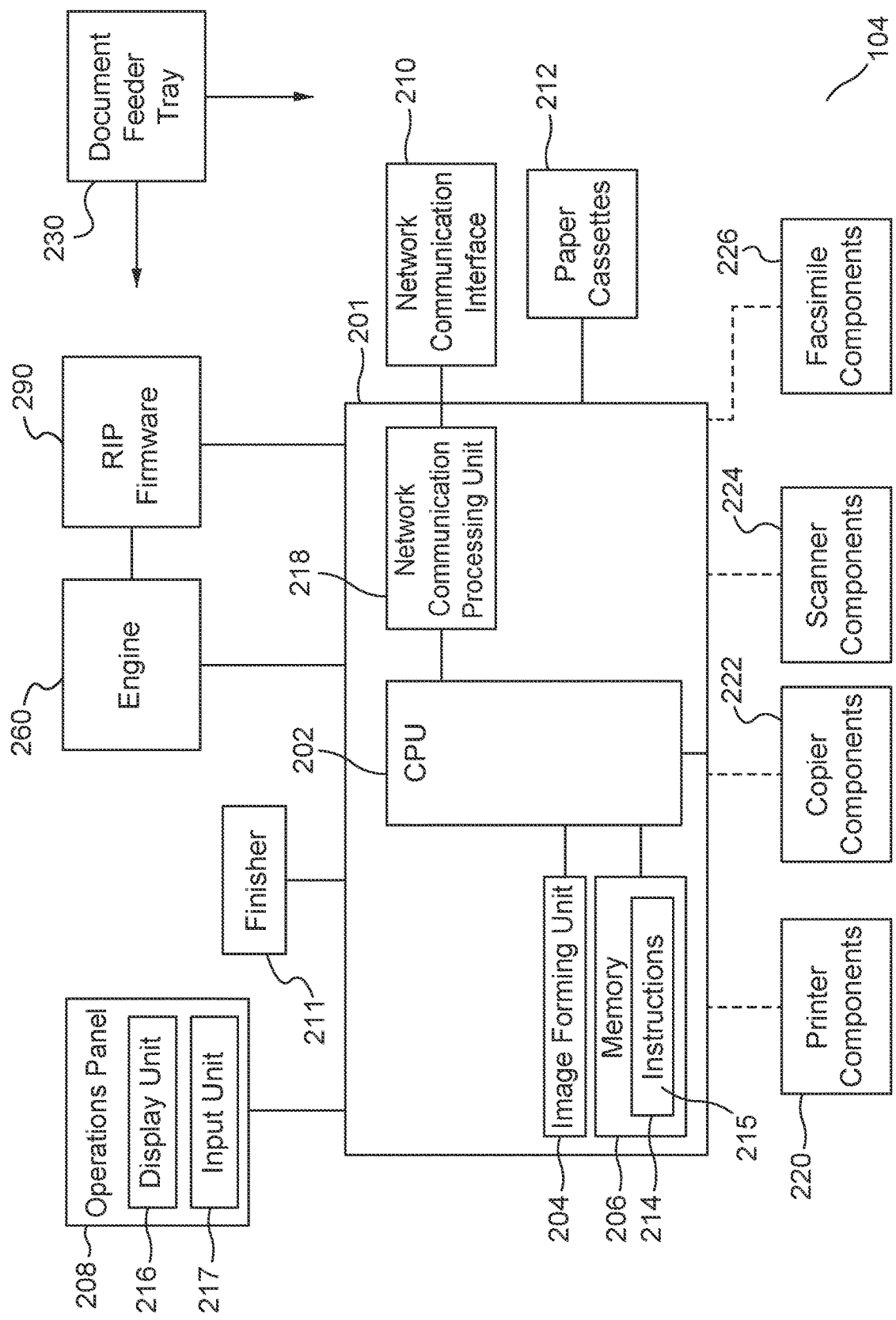
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from order management server 102 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with network service 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from network service 106.

Figure 3:
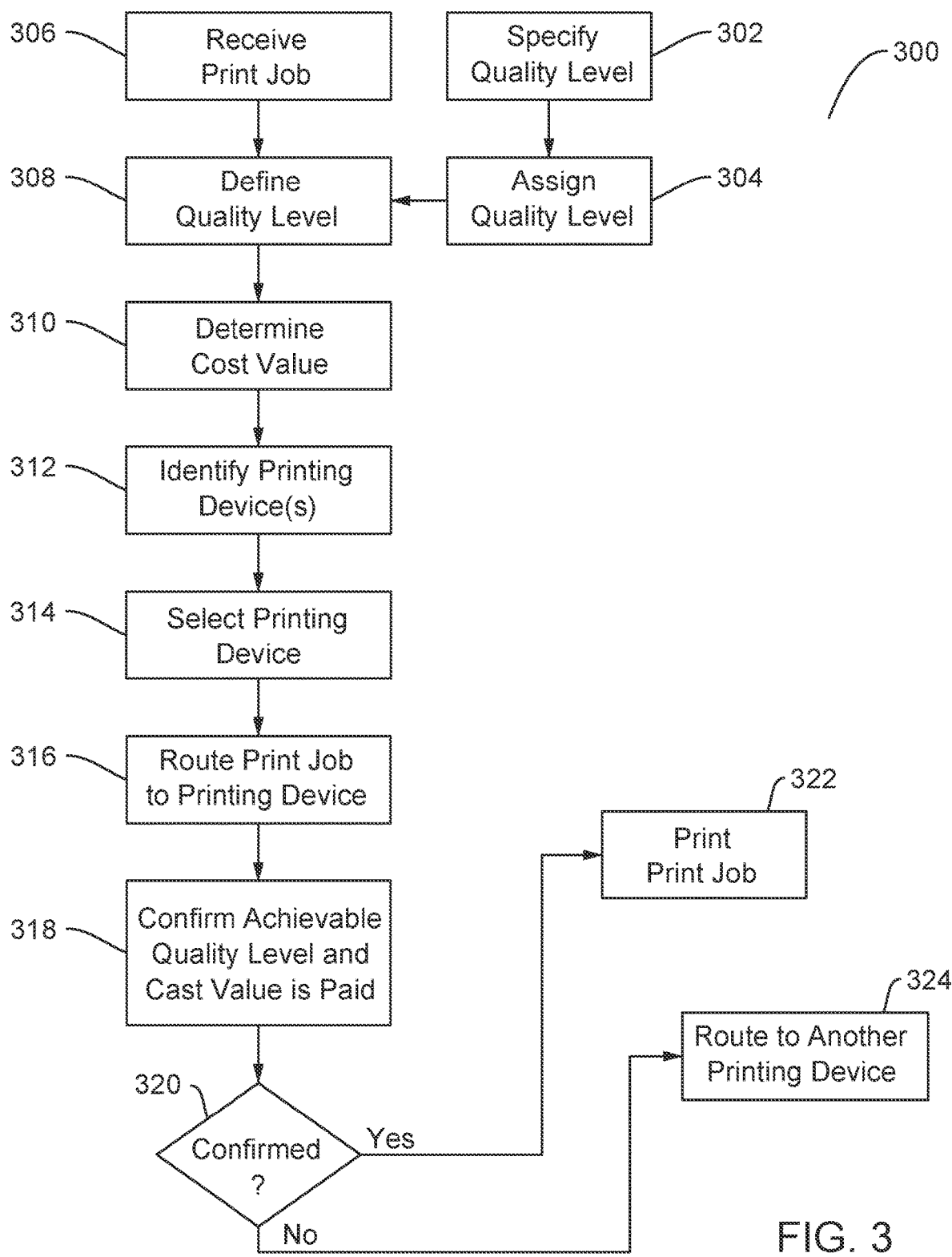
FIG. 3 illustrates a flowchart for controlling a print process using a plurality of printing devices according to the disclosed embodiments.

FIG. 3 depicts a flowchart 300 for controlling a print process using a plurality of printing devices 104, 106, and 108 according to the disclosed embodiments. Flowchart 300 may refer to FIGS. 1, 2, and 4 for illustrative purposes. The embodiments disclosed by flowchart 300, however, are not limited to FIGS. 1, 2, and 4. FIG. 4 depicts a table 400 showing parameters for printing devices to route print jobs according to the disclosed embodiments. Some features disclosed in table 400 refer to elements shown in FIGS. 1 and 2, also for illustrative purposes.

Step 302 executes by specifying a quality level 114 for print jobs of a specific client or customer. For example, some clients may want all their print projects to be at a certain quality level, such as standard quality level 114B. Print shops may provide customers the option to specify the quality level from their printing projects. Alternatively, print shops may assign the quality level based on the print jobs themselves. In some embodiments, order management system 102 may assign the quality level after receiving input from the print shop based on the customer's needs. The print shop may aggregate information about the quality requirements for their customers in order to allocate different quality targets to different printing devices. Step 304 executes by assigning quality level 114 to a customer's print projects within system 100.

Step 306 executes by receiving a print job, such as print job 110A, within system 100. A plurality of print jobs also may be received in this step. For example, referring to column D in table 400, print jobs 110A, 110B, 110C, and 402 may be received. Step 308 executes by defining quality level 114 for each print job. In some embodiments, quality level 114 may be assigned based on the customer's specifications. In other embodiments, the quality level is assigned as the print jobs are received. As noted above, the customer may specify the quality level. Alternatively, order management system 102 may assign the quality level based on information provided with the orders.

Referring to table 400, column E may refer to the quality levels assigned to each print job. For example, print job 110A has an assigned quality level 112A of budget quality level 114C. Print job 110B has an assigned quality level 112B of standard quality level 114B. Print job 110C has an assigned quality level 112C of cheap quality level 114D. Print job 402 has an assigned quality level 112D of premium quality level 114A. Print job 402 and assigned quality level 112D are not shown in FIG. 1, but it may be appreciated that these features are received and generated in system 100 by order management system 102.

Step 310 executes by determining a cost value for each print job. Customers may have the ability to see differential pricing for different quality levels. This feature allows the customers to decide on the quality level for which they want to pay. This benefit differs from conventional printing systems that do not offer tiered pricing based on the gamut and stringency of color matching. Further, this feature differs from pricing structures that offer tiered pricing based on schedule or the quality of the materials, such as premium paper, or the process. It should be noted that this step may occur before any of the previous steps such that the customer can view the different prices for each print job along with applicable quality levels.

Referring to table 400, column F shows the calculated cost values for each print job listed in column D. Cost value 450 is the amount needed to complete print job 110A. Cost value 452 is the amount needed to complete print job 110B. Cost value 454 is the amount needed to complete print job 110C. Cost value 456 is the amount needed to complete print job 402. Based on the assigned quality levels, cost value 456 should be higher than the other costs values as print job 402 is assigned premium quality level 114A. Print job 110C has cost value 454, which should be least amount to pay to complete the print job. Cost values also may depend on the printing device selected to complete the print job. As this selection also depends on the assigned quality level, the quality needed to complete the print job is still a factor in pricing.

Step 312 executes by identifying one or more printing devices within system 100 to process the print jobs. Printing devices are selected based on their capability to complete the print job at the assigned quality level. Tracking quality level allows order management system 102 to use only relevant printing devices in the print shop that can achieve the required quality level. This feature also takes into account those printing devices that can achieve the assigned quality level that are not currently processing print jobs. For example, printing device 106 enjoys an achievable quality level of premium quality level 114A. It would not make sense to route all of the print jobs in column D to printing device 106 as it can achieve all the assigned quality levels. Order management system 102 routes print jobs to other printing devices according to the assigned quality levels and the achievable quality levels.

Referring to table 400, column A lists the printing devices in system 100. As shown in FIG. 1, printing devices 104, 106, and 108 are available. In some embodiments, a large number of printing devices may be available. These printing devices may be grouped according to quality levels, as disclosed in greater detail below. Column B lists the achievable quality levels based on the printing device's current ability. Printing device performance may degrade over time so that the printing device is not able to achieve higher quality levels for print jobs. As shown, printing device 104 has an achievable quality level 104Q corresponding to standard quality level 114B. Printing device 106 has an achievable quality level 106Q corresponding to premium quality level 11A. Printing device 108 has an achievable quality level 108Q corresponding to budget quality level 114C.

Order management system 102 identifies the printing devices and their achievable quality levels. Thus, step 314 executes by selecting a printing device for the received one or more print jobs. For example, if the received print job is print job 402, then order management system 102 may select printing device 106 as it is the only that can achieve a quality level of premium. Alternatively, if the received print job is print job 110C, then order management system 102 may select printing device 108 as it may not be as busy as the higher quality level printing devices and can achieve a budget quality level, which is higher than assigned quality level 112C of cheap.

As may be shown in column C of table 400, assigned print jobs are listed. Order management system 102 may take into account quality level to track and route print jobs. Other factors also may be taken into account, such as paper, media, existing print queues, and the like. Column C, however, shows which print jobs may be selected based on the achievable quality levels. For printing device 104, print jobs 110A, 110B, or 110C may be routed thereto. For printing device 106, all print jobs may be routed thereto. For printing device 108, print jobs 110A or 110C may be routed thereto.

Step 316 executes by routing the print job to the selected printing device. Column C shows the print jobs assigned to the different printing devices taking into account the assigned quality levels and achievable quality levels of the printing devices. Printing device 104 may be assigned print job 110A because it has an assigned quality level 112A of budget quality level 114C and its achievable quality level 104Q is standard. Printing device 106 may be assigned print jobs 110B and 402 as it is the only printing device available to handle these assigned quality levels. Print job 110B may be sent here is printing device 104 already has a number of print jobs to process. Printing device 108 is assigned print job 110C as it has the lowest achievable quality level in system 100. In some embodiments, not many cheap quality level 114D print jobs are received so that the lowest quality printing device is used for these print jobs.

Step 318 executes by confirming that the selected printing device can achieve the assigned quality level and that the cost value has been paid. This step may confirm that printing may occur with causing problems at the printing device. Quality checks may be used to determine print quality at the printing devices. Further, order management system 102 may determine whether cost value is received from the customer. In some embodiments, the requirement to pay before printing may be removed. Thus, before printing print job 110A on printing device 104, order management system 102 may confirm using print quality 116A that achievable print quality 104Q is budget quality level 114C or higher. It also may confirm that cost value 450 has been paid.

Step 320 executes by determining whether printing operations on the selected printing device is confirmed. If yes, then step 322 executes by printing the print job at the selected printing device at the assigned quality level. Step 322 also may remove the cost value amount from the customer's account. If step 320 is no, then step 324 executes by routing the print job to another printing device within system 100. The above disclosed process may be repeated to select and confirm a printing device that can achieve the assigned quality level. For example, print job 402 may be sent to printing device 104. Achievable quality level 104Q cannot confirm that a premium quality level 114A is available. Order management system 102 then may route print job 402 to printing device 106.

Figure 5:
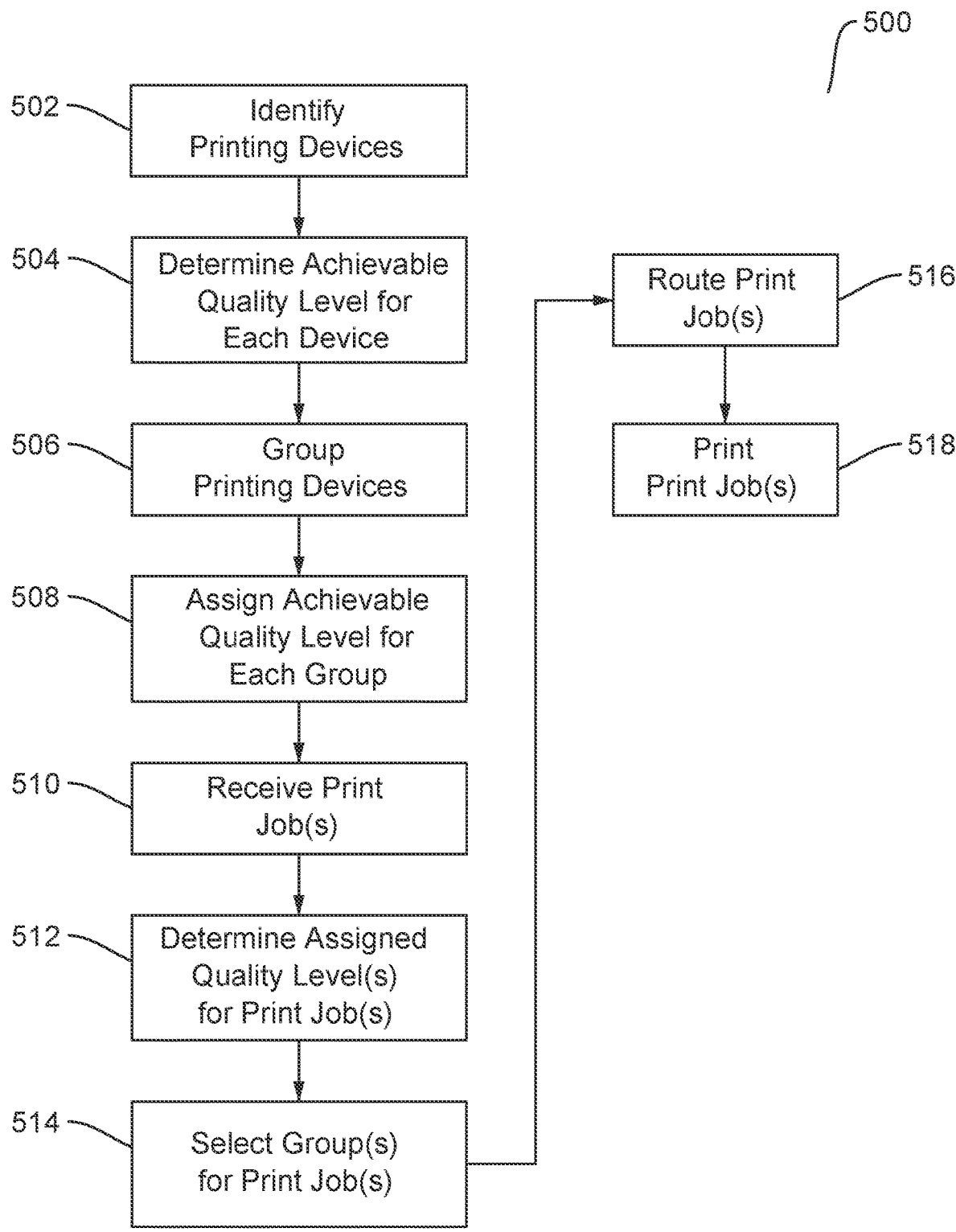
FIG. 5 illustrates a flowchart for managing print jobs for a plurality of printing devices within the print process control system according to the disclosed embodiments.

FIG. 5 depicts a flowchart 500 for managing print jobs for a plurality of printing devices 104, 106, and 108 within system 100 according to the disclosed embodiments. Flowchart 500 may refer to FIGS. 1-4 for illustrative purposes. The embodiments disclosed by flowchart 500, however, are not limited to FIGS. 1-4.

Step 502 executes by identifying the available printing devices within system 100. Referring to FIG. 1, printing devices 104, 106, and 108 are shown. More printing device also may be available within system 100 but not shown for brevity. Step 504 executes by determining an achievable quality level for each printing device. The achievable quality levels correspond to the quality levels 114 assigned to the print jobs within system 100. Referring to table 400, printing device 104 has an achievable quality level 104Q of standard. Printing device 106 has an achievable quality level 106Q of premium. Printing device 108 has an achievable quality level 108Q of budget.

Step 506 executes by grouping the plurality of printing devices into at least two groups according to the achievable quality level for each printing device within the group. For example, order management system 102 may group printing device 106 into one group, which can achieve a premium quality level 114A for print jobs. Another group may include printing device 104 and 108 for lower quality level print jobs. Another example may be a first group of printing devices having achievable quality levels of premium and standard and a second group having achievable quality levels of budget and cheap. Cost values for the printing devices may be determined per group in that the first group may charge more for a print job than the second group. The use of quality levels to determine a cost value is disclosed above. By implementing the quality level for a group for the cost value determination, order management system 102 may simplify pricing quotes for customers.

Step 508 may be executed by assigning an achievable quality level for each group. Referring to printing device 104, 106, and 108, a group of printing device 106 may be assigned premium quality level 114A. A group of printing devices 104 and 108 may be assigned budget quality level 114C as it is the lowest achievable quality level for a printing device within the group. For example, even though printing device 104 has an achievable quality level 104Q of standard, a print job sent to the group of with an assigned standard quality level 114B may not be able to be processed on printing device 108. Thus, this group has an achievable quality level of budget because every printing device can meet this requirement.

Step 510 executes by receiving one or more print jobs within system 100. Step 512 executes by determining the assigned quality levels from the one or more print jobs. This process is disclosed above. Customers may specify quality levels or order management system 102 may determine the quality level needed to complete a printing project within system 100. Referring to table 400, the print jobs in column D are assigned the quality levels shown in column E. Further, order management system 102 may determine the cost values for each print job, as shown in column F.

Step 514 executes by selecting the one or more groups for the one or more print jobs based on the assigned quality level shown in column E. Using the above example groups, print jobs 110B and 402 are assigned to the group including printing device 106 as it can print at the assigned quality levels of premium and standard. Print jobs 110A and 110C are assigned to the group including printing devices 104 and 108 as this group as has assigned achievable quality level of budget. Print job 110B may not be assigned to the second group because printing device 108 cannot achieve a quality level of standard. Thus, the group of printing device 106 is selected. Step 516 executes by routing the one or more print jobs to the one or more groups, as determined in step 514. Step 518 executes by printing the one or more print jobs on at least one printing device. The process for confirming and rerouting print jobs disclosed above may be applied as well.

Thus, according to flowchart 500, printing devices are grouped according to some criteria, such as achievable quality levels. Other criteria may include potential quality level that a printing device can achieve if maintenance is performed. Printing devices also may be grouped according to other criteria. Once the groups are determined, an achievable quality level is assigned to each group that corresponds to the lowest achievable quality level for a printing device within the group. In other words, the achievable quality level should apply to all printing devices within the group. Print jobs are routed based on the assigned achievable quality level, or upon the lowest achievable quality level for a printing device within the group.

Figure 6:
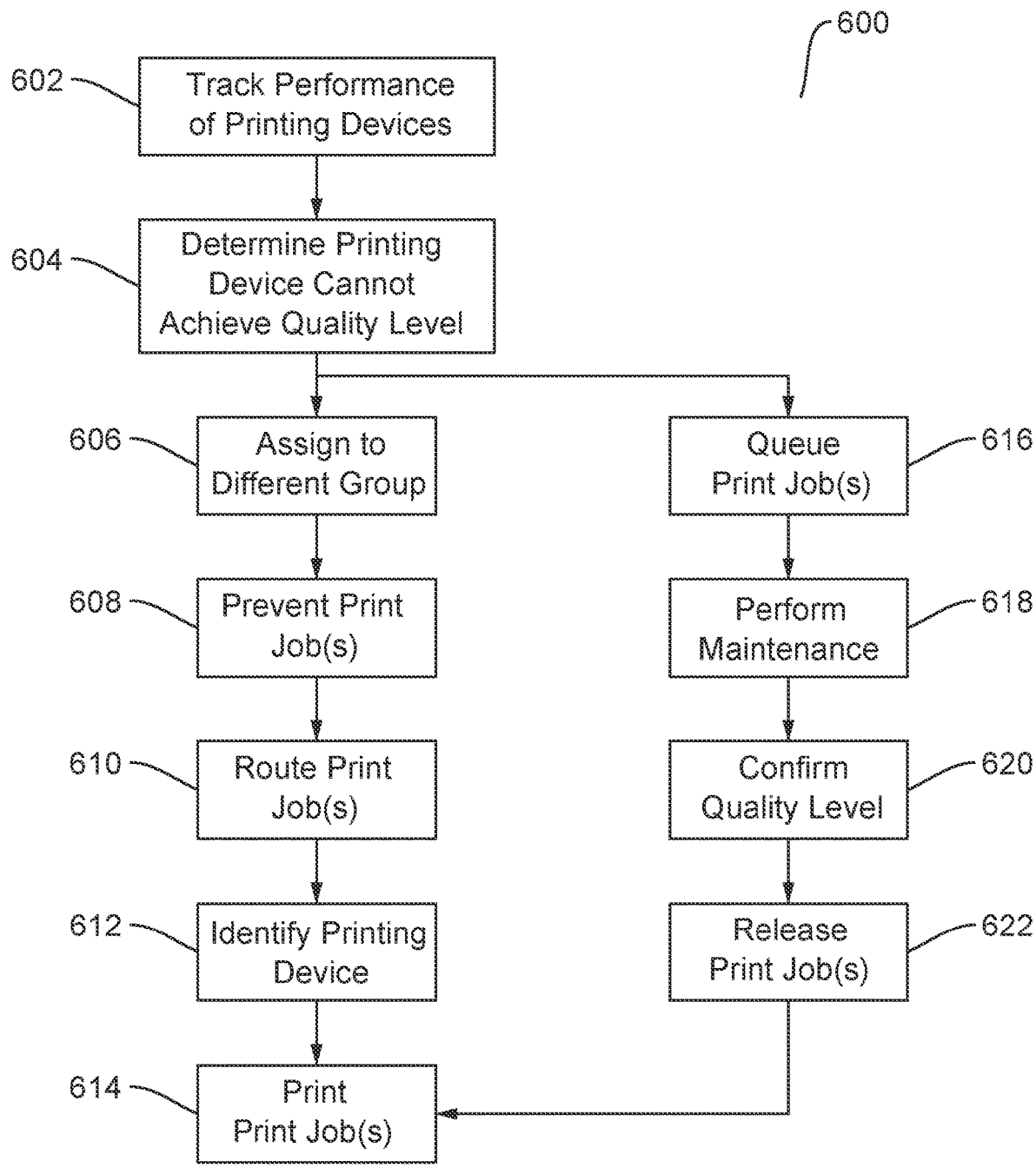
FIG. 6 illustrates a flowchart for managing a printing device within a group according to the disclosed embodiments.

FIG. 6 depicts a flowchart 600 for managing a printing device within a group according to the disclosed embodiments. As noted above, printing device capabilities degrade over time. A printing device initially assigned to a group may need to be removed from the group if its achievable quality level no longer meets group requirements. Alternatively, maintenance may be scheduled to bring the achievable quality level in line with the group's capabilities. Flowchart 600 may refer to FIGS. 1-5 for illustrative purposes. The embodiments disclosed by flowchart 600, however, are not limited to FIGS. 1-5.

Step 602 executes by tracking performance of printing devices within a group. Quality checks may be performed to track the potential and actual color reproduction performance by order management system 102. Print quality 116A may be determined for printing device 104, print quality 116B may be determined for printing device 106, and print quality 116C may be determined for printing device 108. Quality checks may be performed periodically or when requested based on customer feedback.

Step 604 executes by determining that a printing device cannot achieve its specified quality level. If the printing device is within a group, then it may be determined that the printing device cannot achieve the assigned achievable quality level. This determination indicates that the printing device cannot be used for printing operations within the group. Further, it may not receive print jobs corresponding to its potential quality level. For example, printing device 104 may be in a group with printing device 106 that has an achievable quality level of standard quality level 114B. Order management system 102 may determine that printing device 104 not longer can achieve standard quality level 114B as its achievable quality level 104Q. Its achievable quality level 104Q is now budget.

Order management system 102 may take several actions, as shown in flowchart 600. Step 606 executes by assigning the printing device to a different group based on its lower achievable quality level. Using the above example, printing device 104 now has an achievable quality level 104Q of budget. Thus, printing device 104 is assigned to a group with printing device 108, which also has an achievable quality level 108Q of budget. Order management system 102 may update its group listings accordingly.

Step 608 also may execute by preventing one or more print jobs having a standard quality level 114B from printing on printing device 104. Order management system 102 may prevent print jobs from being routed to printing device 104 based on print quality 116A. Step 610 executes by routing these one or more print jobs to another printing device that can meet the assigned quality level. Step 612 executes by identifying the printing device to meet the assigned quality level. The one or more print jobs are routed to the identified printing device to handle the halted print jobs. For example, order management system 102 may identify printing device 108 as having an achievable quality level 106Q of premium, which also includes standard quality level 114B. Print jobs having an assigned quality level 112A of standard sent to printing device 104 are then rerouted to printing device 106. Printing device 108 is not considered as it cannot achieve a quality level to meet the ones assigned to the print job. Step 614 executes by printing the one or more print jobs at the identified printing device, or, in the above example, printing device 108.

In some embodiments, step 616 executes by queuing, or delaying, the one or print jobs having an assigned quality level 114B at printing device 104. Instead of routing the halted print jobs to another printing device, order management system 102 may instruct printing device 104 to store them until the quality level problems can be resolved. Step 618 executes by performing maintenance on the printing device to return it to its potential quality level for color printing. Order management system 102 may instruct maintenance be performed on printing device 104 to return it to an achievable quality level 104Q of standard or maybe even premium. Once maintenance is complete, step 620 executes by confirming the achievable quality level is available for the printing device. Using the above example, order management system 102 confirms that achievable quality level 104Q for printing device 104 meets the requirements to print at standard quality level 114B. Step 622 executes by releasing the one or more print jobs from the queue that were delayed. Flowchart 600 then proceeds to step 614 to print the one or more print jobs on printing device 104 at standard quality level 114B.

Figure 7:
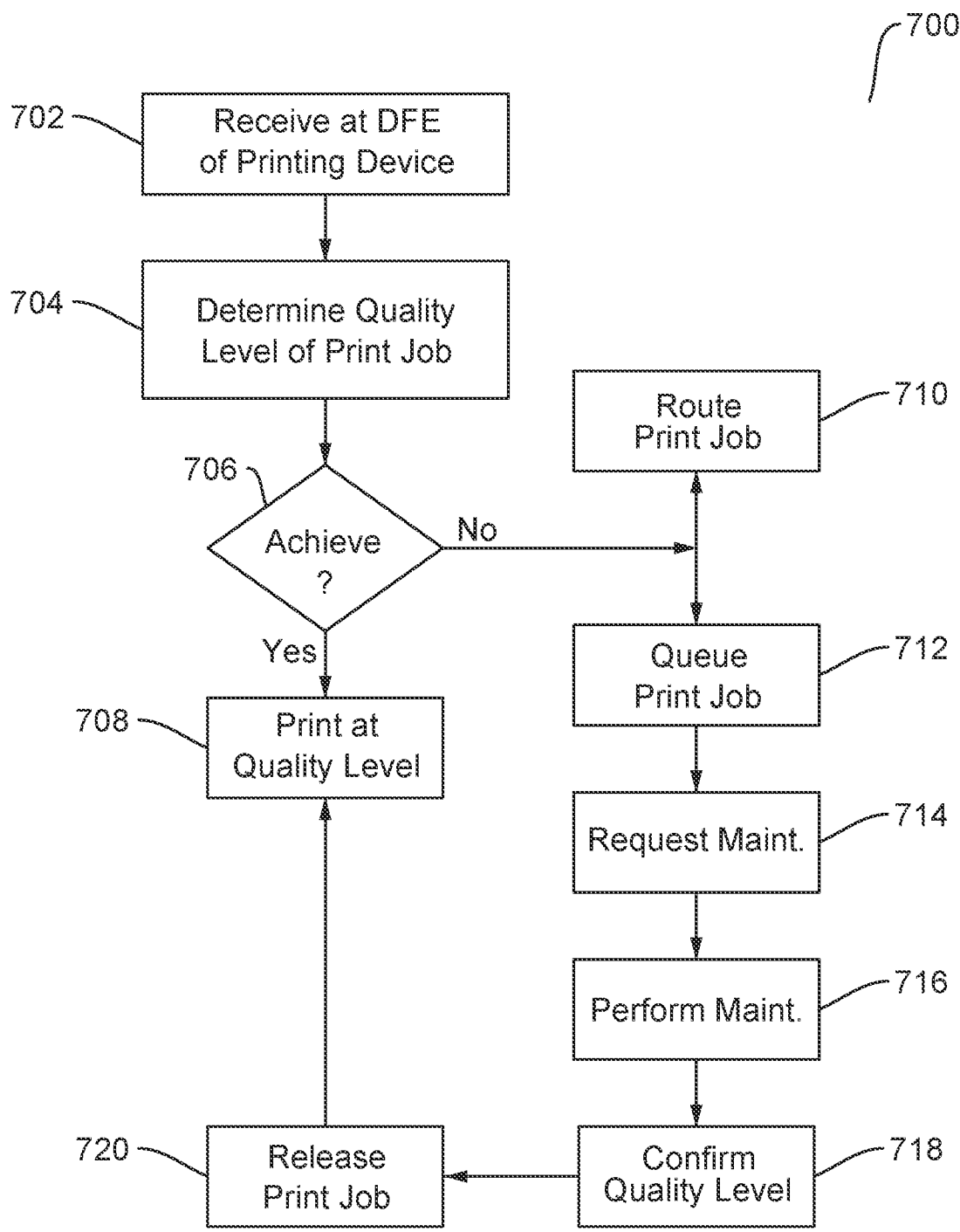
FIG. 7 illustrates a flowchart for managing a print job at a printing device based on an assigned quality level according to the disclosed embodiments.

FIG. 7 depicts flowchart 700 for managing a print job at a printing device based on an assigned quality level according to the disclosed embodiments. Management of print jobs that are not achievable also may be managed at the printing device as opposed to order management system 102. Flowchart 700 may refer to FIGS. 1-6 for illustrative purposes. The embodiments disclosed by flowchart 700, however, are not limited to FIGS. 1-6.

Step 702 executes by receiving print jobs at the digital front end (DFE) of the printing device. For example, printing device 104 may receive print jobs at its DFE. Print jobs may be sent by order management system 102 based on the assigned quality levels for the print jobs and achievable quality level 104Q of printing device 104. Going forward, a single print job is disclosed but the process of flowchart 700 may apply to a plurality of print jobs.

Step 704 executes by determining the assigned quality level of the print job. The assigned quality level may be assigned by order management system 102, as disclosed above. Using the above example, print job 110A has an assigned quality level 112A of budget with a cost value 450. Step 706 executes by determining whether the printing device can achieve the assigned quality level for the print job. As disclosed above, the printing device may perform quality checks to indicate its achievable quality level. Using the above example, printing device 104 receives print job 110A. Printing device 104 determines whether it can meet assigned quality level 112A based on its achievable quality level 104Q. If yes, then step 708 executes by printing the print job at the assigned quality level.

If step 706 is no, then the printing device may take some actions. One such action may be disclosed by step 710, which executes by routing the print job to another printing device within system 100. Printing device 104 may check with order management system 102 on which printing devices are available to process print job 110A. Order management system 102 may indicate printing device 106 is available. Printing device 104 then routes print job 110A to printing device 106, which has an achievable quality level 106Q of premium.

Alternatively, flowchart 700 may proceed to step 712, which executes by queuing the print job at the printing device. This action may delay printing operations for the print job. For example, print job 110A may be stored at printing device 104. An alert may be sent to order management system 102 about the delay and that print job 110A cannot be processed. Step 714 executes by requesting maintenance be performed on the printing device. Using the above example, order management system 102 or printing device 104 may request maintenance be done to return the printing device to an achievable quality level 104Q corresponding to standard quality level 114B. Step 716 executes by performing the maintenance at the printing device. Step 718 executes by confirming the printing device can meet the requirements for the assigned quality level of the delayed print job. Upon confirmation, step 720 executes by releasing the print job from the queue. Flowchart 700 then proceeds to step 708.

Using the above example, printing device 104 receives maintenance. After the maintenance is complete, printing device 104 confirms that it can print at standard quality level 114B, which meets assigned quality level 112A of print job 110A. Print job 110A is released from the storage queue and processed on printing device 104 accordingly.

Figure 8:
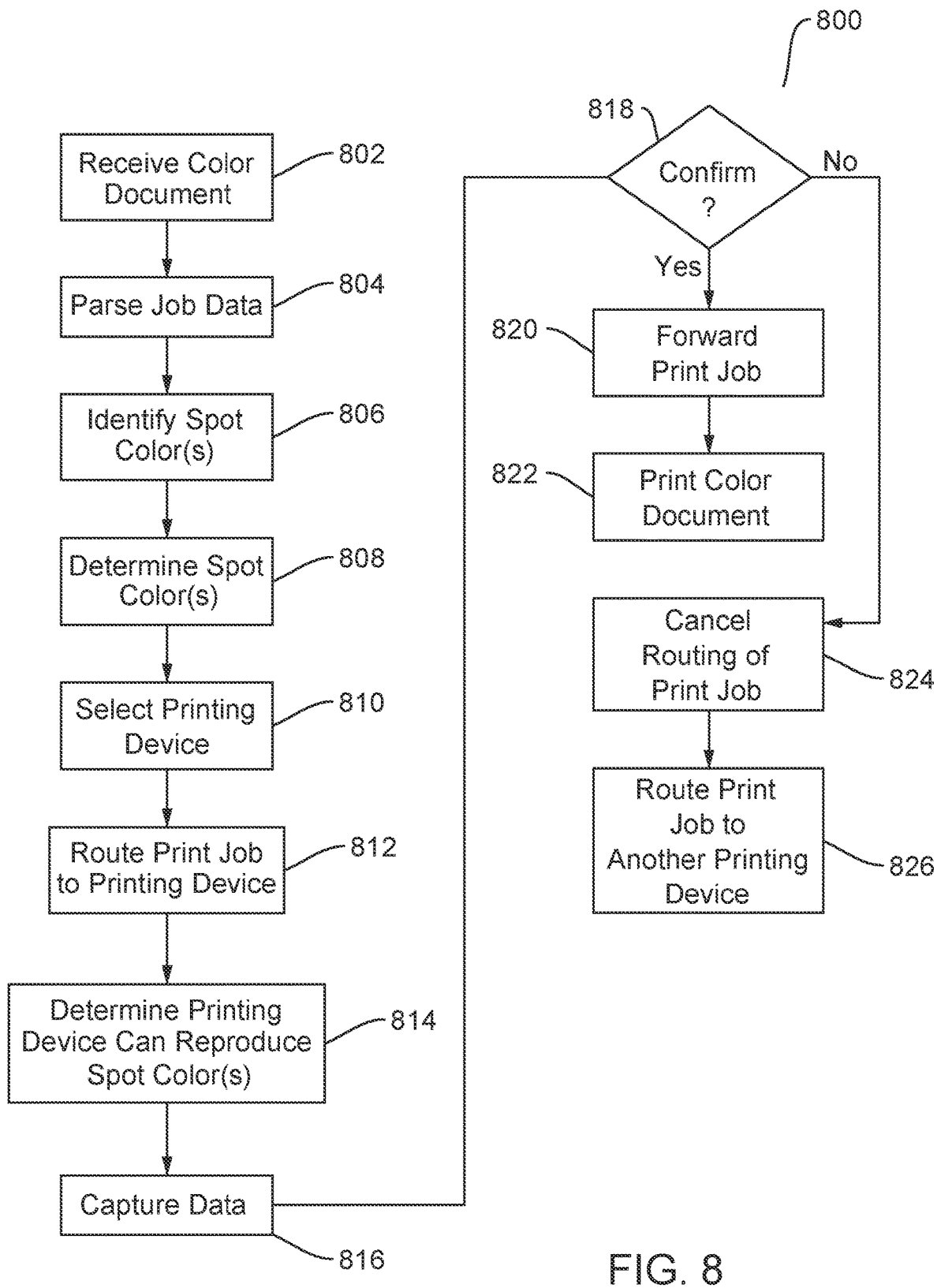
FIG. 8 illustrates a flowchart for managing a print job within the print process control system using spot colors according to the disclosed embodiments.

FIG. 8 depicts a flowchart 800 for managing a print job within print process control system 100 using spot colors 130 according to the disclosed embodiments. Flowchart 800 may refer to FIGS. 1-7 for illustrative purposes. The embodiments disclosed by flowchart 800, however, are not limited to FIGS. 1-7.

Step 802 executes by receiving color document 129 within system 100. Specifically, color document 129 may be sent to order management system 102. Order management system 102 creates a print job for color document 129. As disclosed below, the terms color document and print job may be used interchangeably. Print job may refer to the color document as it routes through system 100 to be printed. One distinction may be that color document 129 may be the document itself while the print job may refer to the number of copies to be made of the color document. Print job 110A may be 10,000 copies of color document 129. Print job 110B may be 8,000 copies of color document 129.

Step 804 executes by parsing job data 132 and any applicable images 140 for the print job related to color document 129. For example, order management system 102 may generate print job 110A for color document 129. Order management system 102 may analyze the data to identify information related to spot colors needed to complete the print job. Step 806 executes by identifying one or more spot colors 130 from the data for print jobs 110A of color document 129. Spot colors 130 may include any number of spot colors. Step 808 executes by determining the specific spot color or colors from the identified information for print job 110A. Order management system 102 also determines the required tolerance to reproduce spot colors 130. The tolerance relates to the quality level at which print job 110A is printed. For example, spot colors 130 may need to be reproduced at a tolerance of 4dE, which corresponds to standard quality level 114B. These parameters are associated with print job 110A. It should be noted that the process of identifying spot colors can be performed along with gamut reproduction processes as well.

Step 810 executes by selecting a printing device, such as printing device 104, to process print job 110A based on spot colors 130. Order management system 102 selects a printing device that can reproduce identified spot colors 130 at the required tolerance. As disclosed above, order management system 102 determines achievable quality levels for the printing devices and selects one that can achieve the level to reproduce color document 129. Step 812 executes by routing print job 110A to the selected printing device, in this case printing device 104 based on its ability to reproduce the specified spot colors with the required level of tolerance. For example, order management system 102 may designate printing device 104 to receive print job 110A. Before sending the print job, however, order management system 102 may confirm that printing device 104 can actually reproduce the color spots. This may be important if print job 110A requires a large number of copies.

Thus, step 814 executes by determining printing device 104 can reproduce spot colors 130. This process may be disclosed in greater detail above and below. In some embodiments, order management system 102 may generate test chart 134 to include color patches corresponding to color spots 130 to print on printing device 104. Test chart 134 may be sent to printing device 104 as well as to printing devices 106 and 108. Order management system 102 may need to send separate print jobs for color document 129 within system 100 so that it needs confirmation from more than one printing device. Step 816 executes by capturing data at printing device 104 of its ability to reproduce spot colors 130. In some embodiments, test chart 134 is measured to capture the color reproduction data. This data, shown as measured data 136 in FIGS. 1B and 1C, is provided to order management system 102.

Step 818 executes by confirming whether printing device 104 meets the required parameters for reproducing spot colors 130 for print job 110A. Order management system 102 may analyze the received data to determine if the tolerances can be met. If step 818 is yes, then step 820 executes by forwarding print job 110A to printing device 104. Step 822 executes by printing print job 110A of color document 129 and reproducing the colors within the print job accordingly.

If step 818 is no, then flowchart 800 proceeds to step 824, which executes by cancelling routing of print job 110A to printing device 104. Print job 110A may be held in a queue until maintenance is performed on printing device 104, as disclosed above with regard to quality levels for gamut reproduction. Once the maintenance is completed, print job 110A may be released for printing on printing device 104. Alternatively, step 826 may execute by routing print job 110A to another printing device within system 100 that can reproduce spot colors 130 at the required tolerance. The new printing device may be selected from measured data 136 received therefrom based on test chart 134 for print job 110A.

Figure 9:
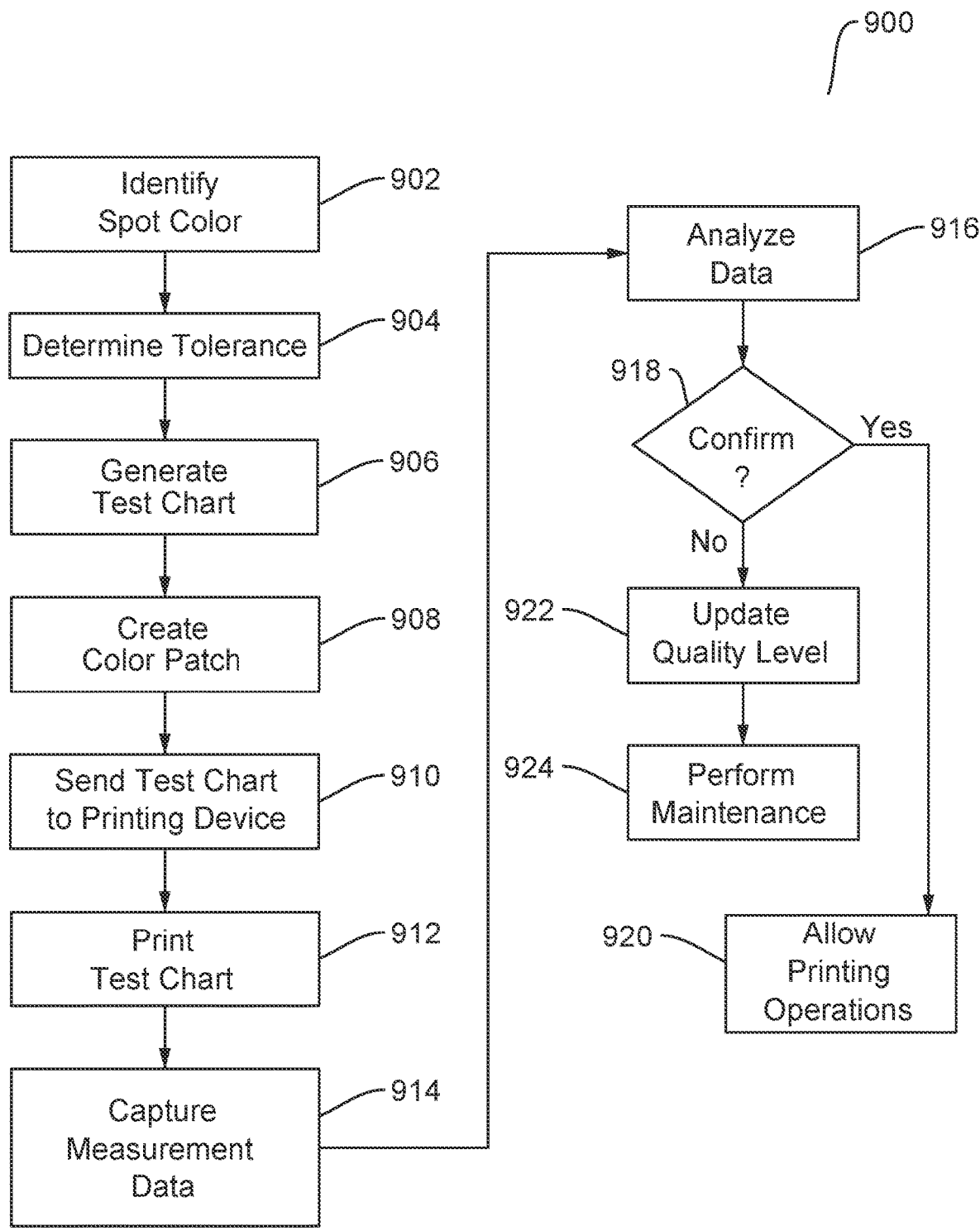
FIG. 9 illustrates a flowchart for using a test chart for managing color printing on a printing device according to the disclosed embodiments.

FIG. 9 depicts flowchart 900 for using test chart 134 for managing color printing on a printing device according to the disclosed embodiments. Flowchart 900 may refer to FIGS. 1-8 for illustrative purposes. The embodiments disclosed by flowchart 900, however, are not limited to FIGS. 1-8. Test charts 134, as disclosed above, may be used to confirm that spot colors can be reproduced on a printing device prior to processing a color print job. The use of test charts 134 allows order management system 102 to make real time decisions on routing print jobs and managing color printing between a plurality of printing devices. Print jobs are not sent to printing devices that cannot reproduce the colors within the jobs according to the desired tolerances or quality levels.

Step 902 executes by identifying one or more spot colors 130 from job data 132 or images 140 for a print job of color document 129. Color document 129 includes a color that uses a spot color that may be reproduced for the print job. Step 904 executes by determining a tolerance for reproducing one or more spot colors 130. Order management system 102 may assign the tolerance based on customer request or history, a desired quality level, the tolerance needed to reproduce the spot color, and the like. Preferably, the tolerance level corresponds to one of quality levels 114.

Step 906 executes by generating test chart 134 to test the color printing capability of printing device 104 (or any other printing device within system 100). Test chart 134 is its own print job that is sent to printing devices. Step 908 executes by creating one or more color patches corresponding to the one or more spot colors identified above. As shown in FIG. 1C, test chart 134 may include the number of color patches needed to test the spot colors for the print job. In some print jobs, it may include 1 color patch. In others, it may be 5 or more. Further, test chart 134 may include color patches for spot colors identified for other print jobs.

Step 910 executes by sending test chart 134 to printing device 104. In some embodiments, test chart 134 also may be sent to printing device 106 or 108. Test chart 134 may be sent as its own print job within system 100. Step 912 executes by printing test chart 134 at printing device 104, and, if applicable, printing devices 106 and 108. The printed test charts will include the color patches corresponding to the one or more color spots for the print job. As disclosed above, "test chart 134" may be incorporated into other print jobs or items printed at the printing device to save space, time, and resources.

Step 914 executes by capturing measurement data 136 by measuring the color patches of test chart 134. Preferably, an inline spectrophotometer may be used. Alternatively, color measurement tool 135 may be used. The color patches are scanned and the data captured. Measurement data 136 may be forwarded to order management system 102, where it is associated with the applicable print job and test chart 134. In other embodiments, printing device 104 may analyze measurement data 136, such as using its DFE to analyze the captured data.

Step 916 executes by analyzing measurement data 136 to see if the reproduced color spots meet the tolerance requirements specified for the print job. Order management system 102 may determine whether printing device 104 can reproduce color spots 130. It also may receive measurement data 136 from printing device 106 and 108 and perform a similar analysis to determine whether these printing devices can reproduce the spot colors with the required tolerance.

Step 918 executes by determining whether measurement data 136 confirms that the parameters for the print job for color printing can be met. The analyzed measurement data may provide order management system 102 with enough information to make this determination. If yes, then step 920 executes by allowing printing operations for print job 110A, and any other print job requiring the specified tolerance, at printing device 104. If step 918 is no, then flowchart 900 proceeds to step 922, which executes by updating achievable quality level 104Q for printing device 104 with the lower tolerance capability. Order management system 102 then makes use of the new achievable quality level to make decisions on routing print jobs. Any print job possibly routed to printing device 104 may be rerouted to another printing device depending on the received measurement data for test chart 134. Step 924 executes by performing maintenance on printing device 104 to improve its color printing tolerances. Order management system 102 may instruct an operator to perform the maintenance or it may schedule maintenance to be performed.

Figure 10:
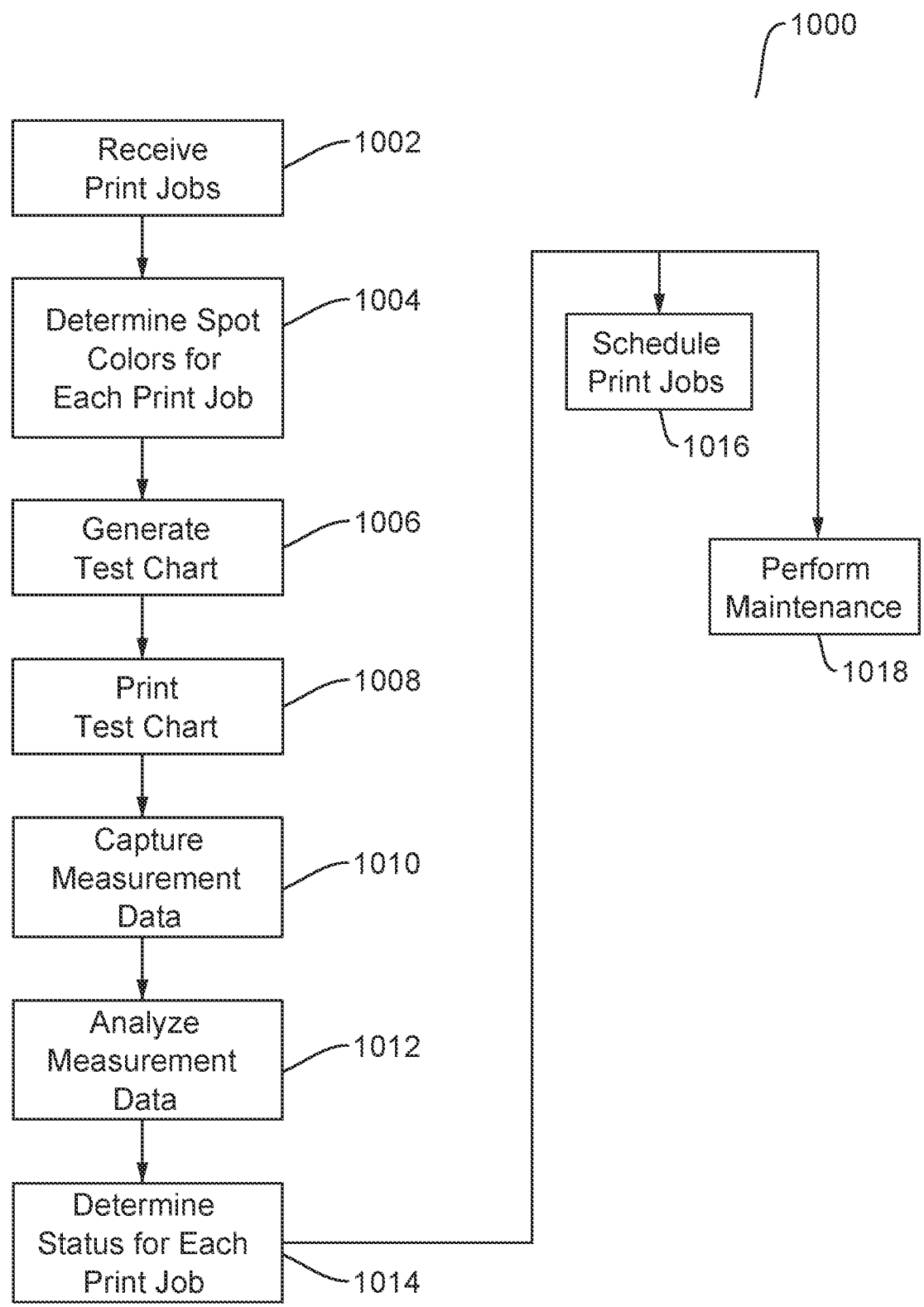
FIG. 10 illustrates a flowchart for scheduling one or more print jobs using spot colors and a test chart according to the disclosed embodiments.

FIG. 10 depicts a flowchart 1000 for scheduling one or more print jobs using spot colors 130 and test chart 134 according to the disclosed embodiments. Flowchart 1000 may refer to FIGS. 1-9 for illustrative purposes. The embodiments disclosed by flowchart 1000, however, are not limited to FIGS. 1-9. As disclosed above, order management system 102 may use measurement data 136 captured from test 134 to determine how accurately a printing device can reproduce required spot colors. Order management system 102 also can evaluate spot color reproduction performance for multiple print jobs at once, or using a single test chart 134, as disclosed in FIG. 1C. This information also may be used to schedule processing of the print jobs according to the disclosed embodiments.

Step 1002 executes by receiving a plurality of print jobs within system 100. Order management 102 may receive multiple color documents 129 to print. Alternatively, order management system 102 may receive a color document 129 to be printed using more than one printing device. Step 1004 executes by determining one or more spot colors 130 for each print job. This process is disclosed above. Each print job may correspond to its own number of print jobs.

Step 1006 executes by generating test chart 134 with color patches for spot colors 130. Again, this feature is disclosed above by FIG. 1C. Using that example, 14 color patches are created for test chart 134. Step 1008 executes by printing test chart 134 with the color patches at one or more printing devices. In some embodiments, test chart 134 may be printed on a single printing device, such as printing device 104. In other embodiments, test chart 134 is printed at multiple printing devices to determine which ones can meet the required tolerances for the spot colors.

Step 1010 executes by capturing measurement data 136 from the color patches of test chart 134. Measurement data 136 may be captured at each printing device that receives the test chart. Step 1012 executes by analyzing measurement data 136 from each printing device. Step 1014 executes by determining a status for each print job associated with test chart 134. Order management system 102 associates the received measurement data with the applicable print job. Referring to FIG. 1C, measurement data 136 associated with color patch 142 is associated with print job 1, measurement data 136 associated with color patches 144 is associated with print job 2, and so on. Using the data, order management system 102 can determine which print job may be performed on the printing device. For example, the analyzed measurement data may indicate that printing device 104 does not meet the required parameters for print jobs 3 and 5. Thus, those print jobs will not be sent to printing device 104.

Step 1016 executes by scheduling the print jobs to be processed according to the analyzed data. As disclosed above, order management system 102 may determine that one or more print jobs may not be reproduced according to the defined tolerances for the spot colors. Those print jobs will be routed to a printing device that meets the requirements. As noted above, test chart 134 may be sent to multiple printing devices. Order management system 102 may use the received measurement devices to route print jobs accordingly. Using test chart 134 shown in FIG. 1C, printing device 104 may not be able to reproduce the spot colors for print jobs 3 and 5. Printing device 106 can reproduce the spot colors to meet the required tolerances. Thus, order management system 102 may route print jobs 3 and 5 to printing device 106. Printing device 108 may only be able to reproduce the spot colors for print job 6 within the required tolerance. Thus, order management system 102 may route print job 6 to printing device 108 to reduce backlog at printing device 104, which handles print jobs 1, 2, and 4.

Step 1018 also may execute by performing maintenance or scheduling maintenance based on the received measurement data. If printing device 104 cannot meet the requirements to color print a majority of the print jobs of test chart 134, then maintenance may be scheduled. Further, order management system 102 may use test charts 134 to determine when maintenance is scheduled.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A print process control method comprising:
receiving a first print job of a first color document and a second print job of a second color document;
parsing job data and an image for the first print job related to the first color document and job data and an image for the second print job related to the second color document to identify a plurality of spot colors required to color print the first print job and the second print job;
determining required levels of tolerance for the plurality of spot colors;
selecting a first printing device from a plurality of printing devices according to the required levels of tolerance for the plurality of spot colors identified from the respective job data and the respective image;
generating a test chart having a plurality of color patches, wherein a color patch corresponds to one of the plurality of spot colors;
printing the test chart including the plurality of color patches at the first printing device;
measuring the plurality of color patches to capture data for the plurality of spot colors;
providing the captured data to an order management system;
confirming the first printing device can reproduce at least one spot color of the plurality of spot colors for the first print job within the required level of tolerance for the first print job using the captured data at the order management system;
confirming the first printing device cannot reproduce at least one spot color of the plurality of spot colors for the second print job within the required level of tolerance for the second print job using the captured data at the order management system;
routing, by the order management system, the first print job to the first printing device based on a confirmation that the first printing device can reproduce the at least one spot color of the plurality of spot colors for the first print job within the required level of tolerance;
routing, by the order management system, the second print job to a second printing device based on a confirmation that the first printing device cannot reproduce the at least one spot color of the plurality of spot colors for the second print job within the required level of tolerance; and
printing the first color document of the first print job at the first printing device.

2. The print process control method of claim 1, further comprising not selecting the second printing device from the plurality of printing devices because the second printing device cannot reproduce the at least one specific spot color of the plurality of spot colors for the first print job at the required level of tolerance identified from the job data.

3. A method for managing color printing on a printing device, the method comprising:
receiving a print job for a color document at an order management system, wherein the print job includes job data;
identifying at least one spot color from the job data and an image to color print the print job at the order management system, wherein the at least one spot color corresponds to a level of tolerance;
generating a test chart having at least one color patch corresponding to the at least one spot color;
printing the test chart at a printing device;
capturing measurement data pertaining to the at least one color patch;

receiving the measurement data for the at least one color patch at the order management system;

confirming the printing device can reproduce the at least one spot color for the print job within the required level of tolerance for the print job using the captured data at the order management system;

selecting the printing device from a plurality of printing devices according to the required level of tolerance for the at least one spot color identified from the job data at the order management system; and routing the print job to the printing device according to the at least one spot color.

4. The method of claim 3, further comprising assigning a quality level to the print job based on the at least one spot color.

5. The method of claim 4, wherein the routing step includes routing the print job also according to the quality level.

6. The method of claim 3, further comprising determining whether the printing device should be serviced according to the measurement data.

7. A print process control system comprising:

an order management system configured to receive a first print job of a first color document and a second print job of a second color document;

parse job data and an image within the first print job related to the first color document and job data and an image for the second print job related to the second color document to identify a plurality of spot colors required to color print the first print job and the second print job;

determine required levels of tolerance for the plurality of spot colors;

select a first printing device from a plurality of printing devices according to the required levels of tolerance for the plurality of spot colors identified from the respective job data and the respective image;

generate a test chart having a plurality of color patches, wherein a color patch of the plurality of color patches corresponds to one of the plurality of spot colors;

confirm the first printing device can reproduce at least one spot color of the plurality of spot colors for the first print job within the required level of tolerance for the first print job using captured data;

confirm the first printing device cannot reproduce at least one spot color of the plurality of spot colors for the second print job within the required level of tolerance for the second print job using the captured data;

route the first print job to the first printing device based on a confirmation that the first printing device can reproduce the at least one spot color of the plurality of spot colors for the first print job within the required level of tolerance; and routing the second print job to a second printing device based on a confirmation that the first printing device cannot reproduce the at least one spot color of the plurality of spot colors for the second print job within the required level of tolerance; and the first printing device configured to print the test chart including the plurality of color patches;

measure the plurality of color patches to capture data for the plurality of spot colors;

provide the captured data to the order management system;

print the first color document of the first print job.

8. The print process control system of claim 7, wherein the printing device is further configured to capture the data pertaining to the plurality of color patches using a color measurement tool.

9. The print process control system of claim 7, wherein the order management system is configured to determine a cost value for printing a document for the first print job according to the required level of tolerance.

10. The print process control system of claim 8, wherein the order management system is configured to perform a real-time gamut evaluation for the first print job.

* * * * *